US009148477B2

(12) United States Patent
Li et al.

(10) Patent No.: US 9,148,477 B2
(45) Date of Patent: Sep. 29, 2015

(54) METHODS AND APPARATUS FOR COMMUNICATING IN A WIRELESS SYSTEM

(75) Inventors: Junyi Li, Bedminster, NJ (US); Xinzhou Wu, Monmouth Junction, NJ (US); Saurabh Tavildar, Jersey City, NJ (US); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 795 days.

(21) Appl. No.: 12/361,896

(22) Filed: Jan. 29, 2009

(65) Prior Publication Data
US 2010/0191759 A1 Jul. 29, 2010

(51) Int. Cl.
*H04L 5/02* (2006.01)
*H04W 48/14* (2009.01)
(Continued)

(52) U.S. Cl.
CPC ............... *H04L 67/104* (2013.01); *H04L 5/02* (2013.01); *H04L 5/023* (2013.01); *H04L 5/1438* (2013.01);
(Continued)

(58) Field of Classification Search
CPC ..... H04W 24/00; H04W 24/10; H04W 74/06; H04W 48/14; H04W 28/0273; H04W 36/0055; H04W 52/26; H04W 74/002; H04B 17/005; H04L 12/2801; H04L 12/403; H04L 5/02; H04L 5/023; H04L 5/1438; G06F 17/30
USPC ................ 707/759, 763, 769, 713, 719–720; 370/338, 328, 294, 449
See application file for complete search history.

(56) References Cited

U.S. PATENT DOCUMENTS

| 6,363,058 B1 * | 3/2002 | Roobol et al. | 370/310 |
| 6,408,179 B1 * | 6/2002 | Stosz et al. | 455/428 |

(Continued)

FOREIGN PATENT DOCUMENTS

| JP | 63276929 A | 11/1988 |
| WO | WO 01/24557 | * 4/2001 |

(Continued)

OTHER PUBLICATIONS

Enterprise JavaBeans, 3rd Edition by Richard Monson-Haefel 3rd Edition Sep. 2001 0-596-00226-2, Order No. 2262 586 pages.*

(Continued)

*Primary Examiner* — Srirama Channavajjala
(74) *Attorney, Agent, or Firm* — Paul S. Holdaway

(57) ABSTRACT

Methods and apparatus for communicating information, e.g., queries and query responses, in a peer to peer communications network are described. Queries include, e.g., queries for a product, service, activity or activity partner. In some embodiments, a query channel is implemented and utilized. The implemented query channel structure is such that multiple query responses may be communicated corresponding to a single transmitted query. Various embodiments employ randomization in transmission segment selection by an individual communications device within a transmission block to decrease the likelihood of collisions. A communication device's access to the query channel is determined by the communications device itself. A communications device's decision as to whether or not to transmit and/or re-transmit a query is based on one or more of: its query transmission statistics, historical query channel loading information, and priority level information corresponding to the communications device.

28 Claims, 9 Drawing Sheets

(51) Int. Cl.
*H04W 52/26* (2009.01)
*H04L 29/08* (2006.01)
*H04W 28/02* (2009.01)
*H04L 5/14* (2006.01)
*H04W 36/00* (2009.01)

(52) U.S. Cl.
CPC ...... *H04W 28/0273* (2013.01); *H04W 36/0055* (2013.01); *H04W 48/14* (2013.01); *H04W 52/26* (2013.01)

(56) References Cited

U.S. PATENT DOCUMENTS

| | | | |
|---|---|---|---|
| 6,850,494 B1 * | 2/2005 | Bender | 370/254 |
| 7,240,087 B1 * | 7/2007 | Walker | 709/200 |
| 7,756,859 B2 * | 7/2010 | Simonyi | 707/718 |
| 2004/0044790 A1 * | 3/2004 | Loach et al. | 709/241 |
| 2004/0049367 A1 * | 3/2004 | Kurosawa et al. | 702/188 |
| 2004/0178934 A1 * | 9/2004 | Balakrishnan et al. | 341/80 |
| 2004/0255040 A1 * | 12/2004 | Lopes et al. | 709/230 |
| 2005/0025039 A1 * | 2/2005 | Hwang et al. | 370/206 |
| 2005/0165752 A1 * | 7/2005 | Mathew et al. | 707/3 |
| 2005/0172148 A1 * | 8/2005 | Ying | 713/200 |
| 2006/0004884 A1 * | 1/2006 | Kling et al. | 707/202 |
| 2006/0165035 A1 | 7/2006 | Chandra et al. | |
| 2006/0230111 A1 * | 10/2006 | Andersen et al. | 709/205 |
| 2006/0265351 A1 * | 11/2006 | Day et al. | 707/2 |
| 2007/0047510 A1 * | 3/2007 | Cho et al. | 370/338 |
| 2007/0069884 A1 * | 3/2007 | Waxman | 340/539.1 |
| 2008/0013497 A1 | 1/2008 | Belcea | |
| 2008/0033920 A1 * | 2/2008 | Colclasure et al. | 707/3 |
| 2008/0152027 A1 * | 6/2008 | Kalluri et al. | 375/260 |
| 2008/0209004 A1 * | 8/2008 | Hare et al. | 709/217 |
| 2009/0122810 A9 * | 5/2009 | Jin et al. | 370/468 |
| 2009/0141822 A1 * | 6/2009 | Fang et al. | 375/260 |

FOREIGN PATENT DOCUMENTS

| | | | |
|---|---|---|---|
| WO | WO 03/034644 | * | 4/2003 |
| WO | WO2008028319 | | 3/2008 |
| WO | WO 2008/051018 | * | 5/2008 |
| WO | WO 2008/098063 | * | 8/2008 |

OTHER PUBLICATIONS

Makoto Yoshida et al., "A Comparison of OFCDM and segmented-OFDM in Broadband MIMO Downlink Channel" I EEE Communications Society, 2004, pp. 1182-1187.*

International Search Report and Written Opinion—PCT/US2010/022457, International Search Authority—European Patent Office—Jul. 6, 2010.

Taiwan Search Report—TW099102630—TIPO—Jan. 17, 2013.

* cited by examiner

US 9,148,477 B2

METHODS AND APPARATUS FOR COMMUNICATING IN A WIRELESS SYSTEM

FIELD

Various embodiments relate to wireless communications methods and apparatus and, more particularly, to communications methods and apparatus that support communication of information, e.g., queries and/or query responses, between wireless devices.

BACKGROUND

Users are tending to rely more and more upon wireless communications for all kinds of interactions, business as well as social, in addition to using wireless communications for conventional voice communications. As the number of wireless communications devices in service has continued to increase competition for the limited amount of available air link resources has been growing. One area of wireless communications experiencing growth is peer to peer communications, e.g., in ad hoc networks lacking centralized control or coordination. In such an environment there is a need for devices to be able to communicate information between peers, e.g., queries and query responses. In an environment lacking centralized control in which users may come and go at will, it is problematic to efficiently allocate the scarce amount of available air link resources to the devices in the network at a given time.

Based on the above discussion there is a need for efficient methods and apparatus that allow wireless communications devices to communicate information, e.g. queries and/or query responses, between one another. It would be particularly beneficial if methods and apparatus for communicating queries and/or query responses without the need for a central control device to allocate resources to individual devices for such communications could be developed.

SUMMARY

Methods and apparatus related to the communication of information between peers in a wireless communications network are described. Various exemplary methods and apparatus are well suited for use in a peer to peer network, e.g., an ad hoc peer to peer network lacking centralized control where queries and query responses are to be communicated.

Some embodiments use a query channel, e.g., a channel dedicated to the communication of queries and/or query responses. In some embodiments the query channel is implemented as part of a timing structure, e.g., a recurring peer to peer timing structure. Queries and query responses can be communicated using the query channel. In some embodiments, the query channel includes a plurality of transmission blocks, each transmission block including a plurality of transmission segments. The implemented structure is such that multiple query responses may be communicated corresponding to a single transmitted query. Various embodiments employ randomization in transmission segment selection by an individual communications device within a transmission block to decrease the likelihood of collisions.

In some embodiments, a communication device's access to the query channel is determined by the communications device itself. In some such embodiments, a communications device's decision as to whether or not to transmit and/or re-transmit a query is based on one or more of: its query transmission statistics, historical query channel loading information, and priority level information corresponding to the communications device.

An exemplary communications method, in accordance with one embodiment comprises: transmitting a query in a first transmission segment of a first transmission block, and monitoring a plurality of transmission segments of a second transmission block to detect query responses, said monitored transmission segments corresponding to said first transmission segment. In some such embodiments the query is a query for a product, service, activity or activity partner.

In accordance with an exemplary embodiment, a communications device includes at least one processor configured to: transmit a query in a first transmission segment of a first transmission block, and monitor a plurality of transmission segments of a second transmission block to detect query responses, said monitored transmission segments corresponding to said first transmission segment. The exemplary communications device includes a memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
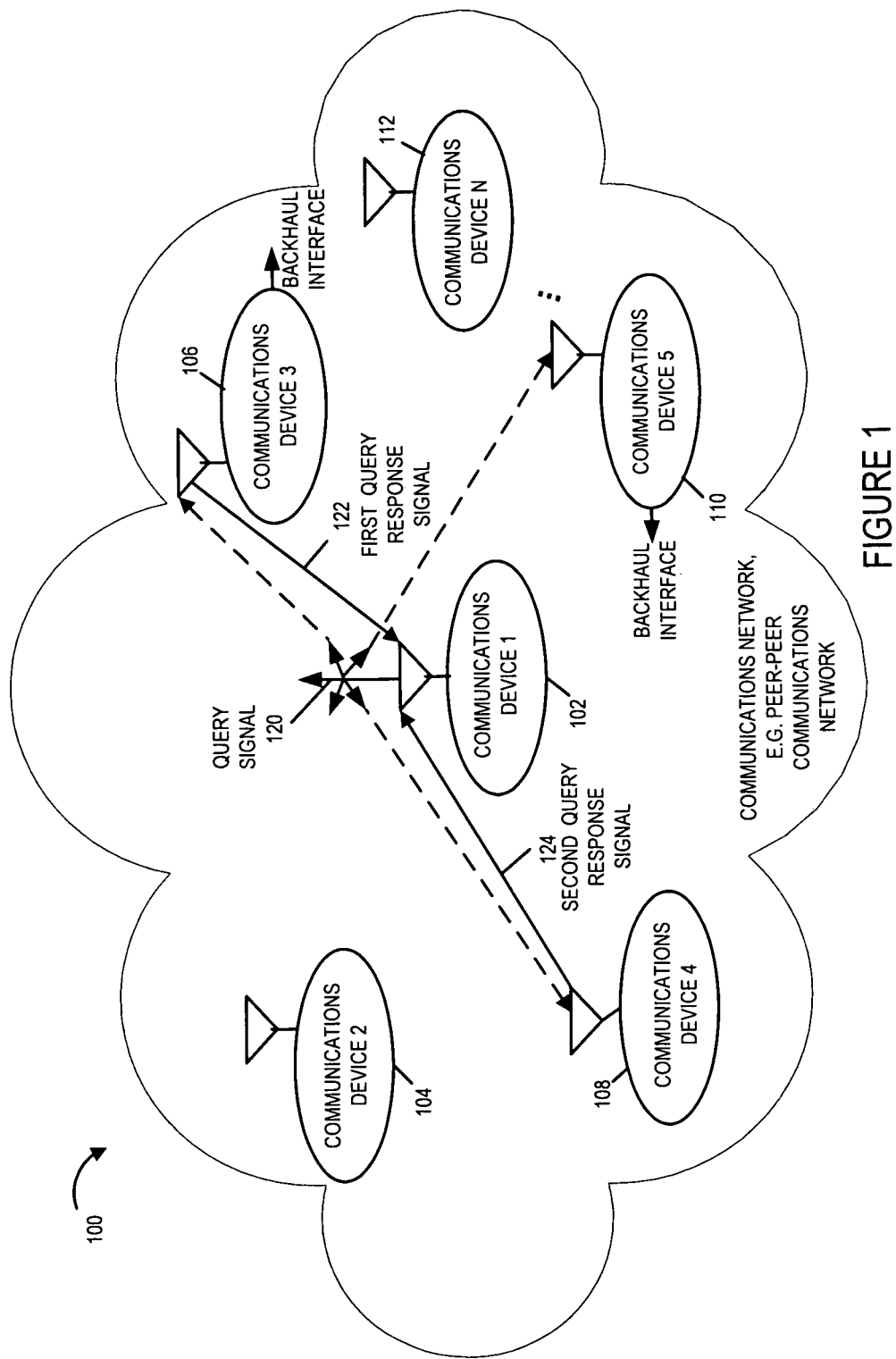
FIG. 1 is a drawing of an exemplary communications network, in accordance with one exemplary embodiment.

FIG. 1 illustrates an exemplary communications network 100, e.g., an ad-hoc peer to peer wireless communications network, in accordance with one exemplary embodiment. Exemplary communications network 100 includes a plurality of communications devices, e.g., peer to peer wireless communications devices, including communications device 1 102, communications device 2 104, communications device 3 106, communications device 4 108, communications device 5 110, . . . , communications device N 112. Each communications devices (102, 104, 106, 108, 110, 112) includes or is coupled to an antenna for receiving and/or sending signals, as shown in FIG. 1. Some of the communications devices of network 100 are mobile communications devices, e.g., wireless handheld mobile communications devices, while other communications devices in network 100 may be stationary devices. Some of the communications devices, e.g., communications device 3 106 and communications device 5 110, also include a backhaul interface, e.g. a wired interface, for coupling the communications device to other nodes and/or the Internet.

The communications devices in network 100 support a wireless signaling protocol, e.g., a peer to peer wireless signaling protocol. At least some of the communications devices in network 100 can transmit a query in a transmission segment of a transmission block, monitor to detect query responses in corresponding transmission segments, and make query retransmission decisions. At least some of the communications devices in network 100 can monitor for queries and transmit query responses.

The communications network 100 illustrated in FIG. 1 supports the advertisement of information, e.g., in the form of search queries, as well as the posting of one or more responses to a search query. FIG. 1 illustrates one example of a query transmission and a corresponding set of query responses. Communications device 1 102 transmits, e.g., broadcasts, query signal 120 on a transmission segment of a first transmission block. The query signal 120 may be received by one or more of the other peer to peer communications devices in network 100. The query signal 120 is, e.g., a query for a product, service, activity, or activity partner. For example, the operator of device 1 102 may be searching for a store selling a particular product and/or brand, e.g., brand X shoes, and the query signal 120 may indicate that the query is a search for a seller of brand X shoes.

Although in the FIG. 1 example, device 1 102 is shown as the single device in network 100 transmitting query signal, it should be appreciated that one or more of the other communications devices may also transmit query signals in the same transmission block. It is also possible that two devices may concurrently transmit a query on the same transmission segment of the same transmission block, and thus potentially create interference to successful recovery of each others query transmissions.

In this particular example, consider that communications devices (device 2 104, device 3 106, device 5 110) detect and recover query signal 120 and process the query. Further consider that device 3 106 and device 4 108, decide to respond to query 120, e.g., device 3 106 and device 4 108 are service provider communications devices for malls and/or stores selling brand X shoes. Communications device 3 106 sends first query response signal 122 on a first transmission segment of a second transmission block, and communications device 4 108 sends second query response signal 124 on a second transmission segment of the second transmission block. Communications device 5 110 does not respond back to device 1 102 since it does not have information about the searched item and/or application communicated in the search query 120.

The transmission segment in which query 120 is transmitted may be one of a plurality of transmission segments in the first transmission block. In accordance with one aspect of some embodiments, the transmission segment selected by communications device 1 102 to transmit query 120 is selected in a random fashion from a plurality of possible alternative transmission segments in the first transmission block. Given the absence of a central controller and the random selection of a transmission segment for a query signal, other communications devices attempting to transmit query signals in the same transmission block may unintentionally select the same transmission segment resulting in a collision.

In accordance with one aspect of some embodiments, a device which has transmitted a query, determines whether or not to re-transmit the query in a subsequent transmission block based on one or more of: the number of query responses detected, the information recovered from a detected query response, query channel loading information, priority level information, and statistical information regarding previous query transmissions.

Figure 2:
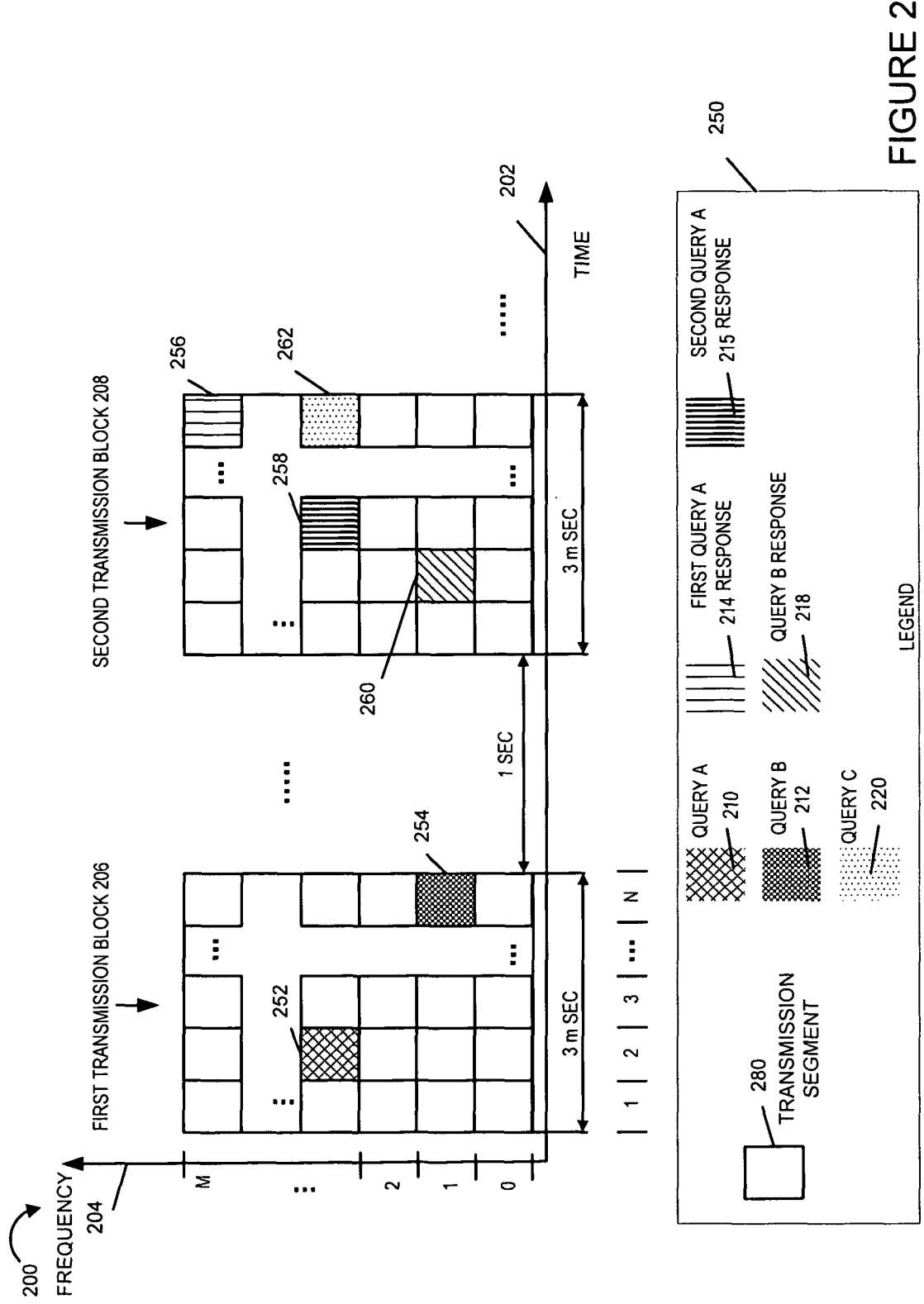
FIG. 2 illustrates exemplary first and second transmission blocks, exemplary transmission segments, exemplary queries and exemplary query responses.

FIG. 2 includes an exemplary frequency vs time plot 200 and corresponding legend 250. In plot 200, the horizontal axis 202 represents time and the vertical axis 204 represents frequency. Plot 200 includes an exemplary first transmission block 206 used to transmit queries and a subsequent transmission block which is second transmission block 208. Second transmission block 208, in this exemplary embodiment, can be used to post query responses to detected queries of the first transmission block 206 and/or additional queries. There can be, and sometimes are, multiple responses to a single query. Thus, second transmission block 208, can be used for posting one or more responses to a transmitted query of block 206, as well as more additional queries. Legend 250 identifies different patterns used to represent exemplary queries and exemplary query responses communicated in the first and second transmission blocks (206, 208). Query signal A is represented by coarse crosshatch shading 210. A first query A response signal is represented by widely spaced vertical line shading 214. A second query A response signal is represented by narrowly spaced vertical line shading 215. First and second query A response signals are sourced from different devices. Query signal B is represented by fine crosshatch shading 212. A query B response signal is represented by diagonal line shading 218. Query signal C is represented by dotted shading 220.

In this example, the first and second transmission blocks (206, 208) include (N×(M+1)) transmission segments, where N and M are positive integers. In some other embodiments, the first and second transmission blocks may be of different sizes. In some embodiments, a transmission segment of a transmission block can carry B information bits, e.g., 50 information bits. Each square in the transmission blocks (206, 208), represents a different transmission segment. Legend 250 illustrates that a square 280 represents a transmission segment. Each transmission segment includes one or more transmission units, e.g., one or more OFDM tone-symbols, where an OFDM tone-symbol is the air link resource of one OFDM tone for one OFDM transmission time interval. In this example, each transmission segment includes a contiguous block of one or more transmission units, e.g., a contiguous block of OFDM tone-symbols corresponding to the same tone. In some embodiments, a transmission segment of a transmission block includes a plurality of OFDM tone-symbols corresponding to different tones during the same OFDM transmission time interval. In some embodiments, a transmission segment may include a disjoint set of transmission units in the transmission block. In some embodiments, a transmission block includes a set of transmission segments, and at least some of the transmission segments are different sizes. In some embodiments, transmission segments of a transmission block can use different air link resources other than OFDM transmission units. For example, CDMA type resources are also possible.

In some embodiments a query channel includes a plurality of transmission blocks such as a set including first and second transmission blocks (206, 208), and the timing characteristics of the transmission blocks are in accordance with a recurring timing structure, e.g., a recurring peer to peer timing structure. For example, in the embodiment of FIG. 2, transmission block 1 206 has a duration of 3 milli-seconds, transmission block 2 208 has a duration of 3 milli-seconds, and transmission block 1 206 is separated from transmission block 2 208 by 1 second. In some embodiments, there is a fixed predetermined time separation between each transmission block in the timing structure. Although referred to as a query channel, it should be appreciated that the transmission blocks of the query channel, in this embodiment, can be used for communicating both queries as well as query responses. In some other embodiments, separate transmission blocks are allocated to queries and query responses. In the embodiment of FIG. 2 transmission segments are the same size for queries and query responses. In some embodiments, a transmission segment for a query is a different size than a transmission segment for a query response.

In accordance with one aspect, a communications device determines if it is authorized to transmit a query based on one or more conditions. For example consider that a communications device, prior to the time of first transmission block 206, decides that it would like to transmit a query in the first transmission block 206. The communications device makes an authorization determination. If the communications device determines that it is authorized, the device selects, e.g., randomly, a transmission segment of the first transmission block 206 and transmits a query signal.

In the example of FIG. 2, two devices which desire to transmit query signals in first transmission block 206, have determined that they are authorized and have each independently randomly selected a transmission segment to use. In this example, a first device has selected transmission segment 252 to carry its query signal, query A 210. A second device has selected transmission segment 254 to carry its query signal, query B 212. In this example, fortunately, the first and second devices have selected different transmission segments to use. However, it is possible that the first and second devices may inadvertently select the same transmission segment in which case the use of the same transmission segment may make it difficult or not possible for other devices to recover one or more of the query signals being transmitted on the common resource which was selected.

In this exemplary embodiment, a device, which has transmitted a query in first transmission block 206, monitors a plurality of transmission segments of second transmission block 208, to detect responses to its transmitted query. There is, in this exemplary embodiment, a predetermined mapping between a transmission segment in the first transmission block 206, which carries a query signal and a set of transmission segments in the second transmission block 208 which can carry responses to that query. The device transmitting the query in the first transmission block 206 knows the mapping relationship, and monitors a particular set of transmission segments in the second transmission block 208 for any response signal that may correspond to its query signal.

Some devices in the network have been monitoring the first transmission block 206, have detected queries, have evaluated the queries and have decided to respond. Consider that the devices which have decided to respond are also aware of the mapping between a particular transmission segment of the first transmission block 206 which carries a query and a matching set of transmission segments in the second transmission block 208 which may be used to carry a query response to that request. Further consider that a device which is responding to a query selects, e.g., randomly, from the matching set of transmission segments in the second transmission block 208.

With regard to query A 210, consider that a third device generates and transmits first query response A 214 using transmission segment 256 of second transmission block 208. Further consider with regard to query A 210, that a fourth device generates and transmits second query A response 215 using transmission segment 258 of second transmission block 208. With regard to query B 212, consider that a fifth device generates and transmits query response B 218 using transmission segment 260 of second transmission block 208.

In this exemplary embodiment, the second transmission block 208 can carry queries in addition to query responses. Consider that a sixth device desires to transmit a query in the second transmission block 208, has decided that it is authorized to transmit the query, and has selected transmission segment 262 of second transmission block 208 to carry the query. The sixth device generates query signal C 220 which it transmits in transmission segment 262.

Figure 3:
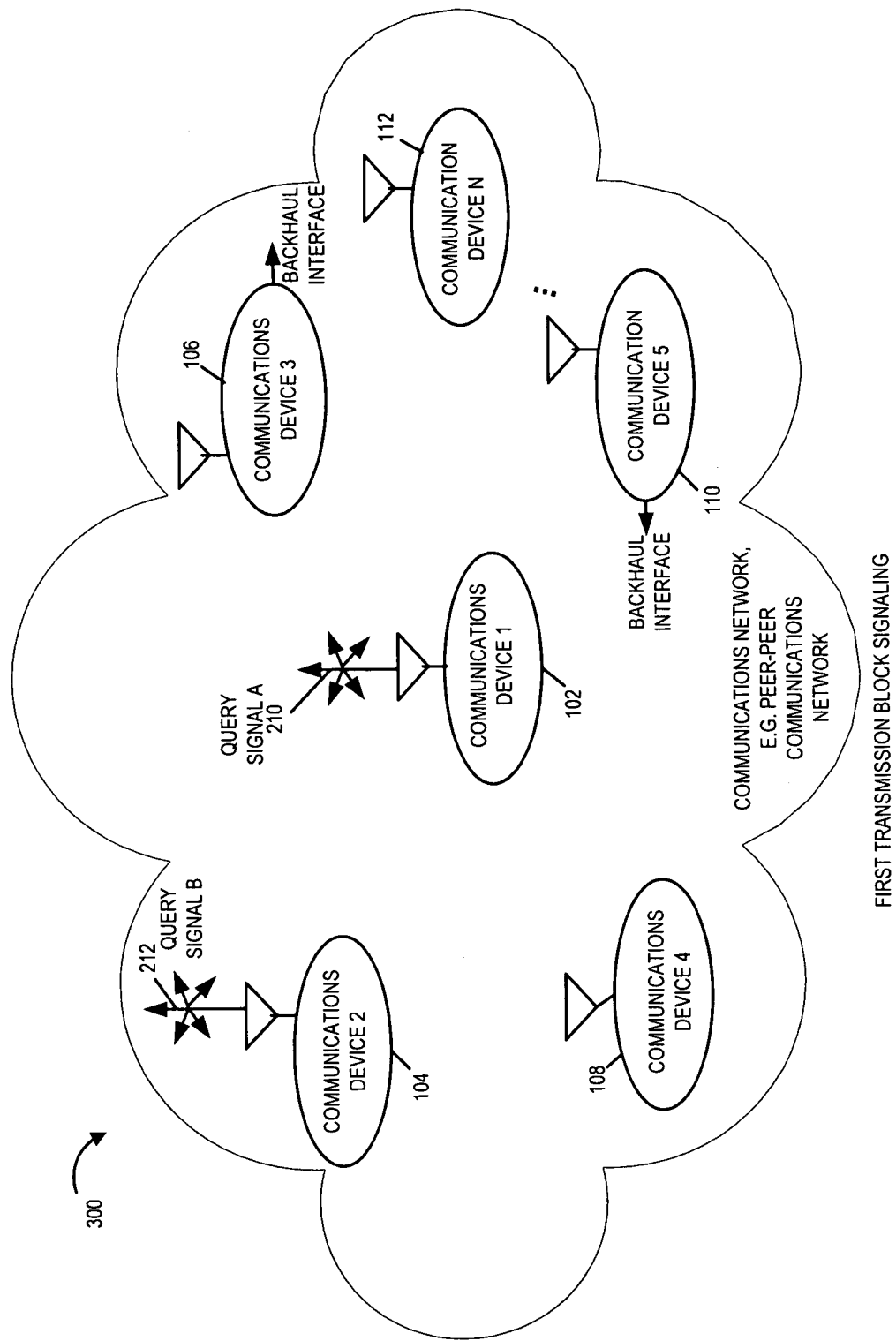
FIG. 3 is a drawing illustrating exemplary signaling carried in the first transmission block.

Now consider the example of FIG. 2 in the context of communications devices presented in network 100 of FIG. 1. FIG. 3 is a drawing 300 illustrating exemplary signaling carried in the first transmission block 206. Communications device 1 102 transmits, e.g., broadcasts, query signal A 210 using transmission segment 252 of the first transmission block 206, and communications device 2 104 transmits, e.g., broadcasts, query signal B 212 using transmission segment 254 of first transmission block 206.

Figure 4:
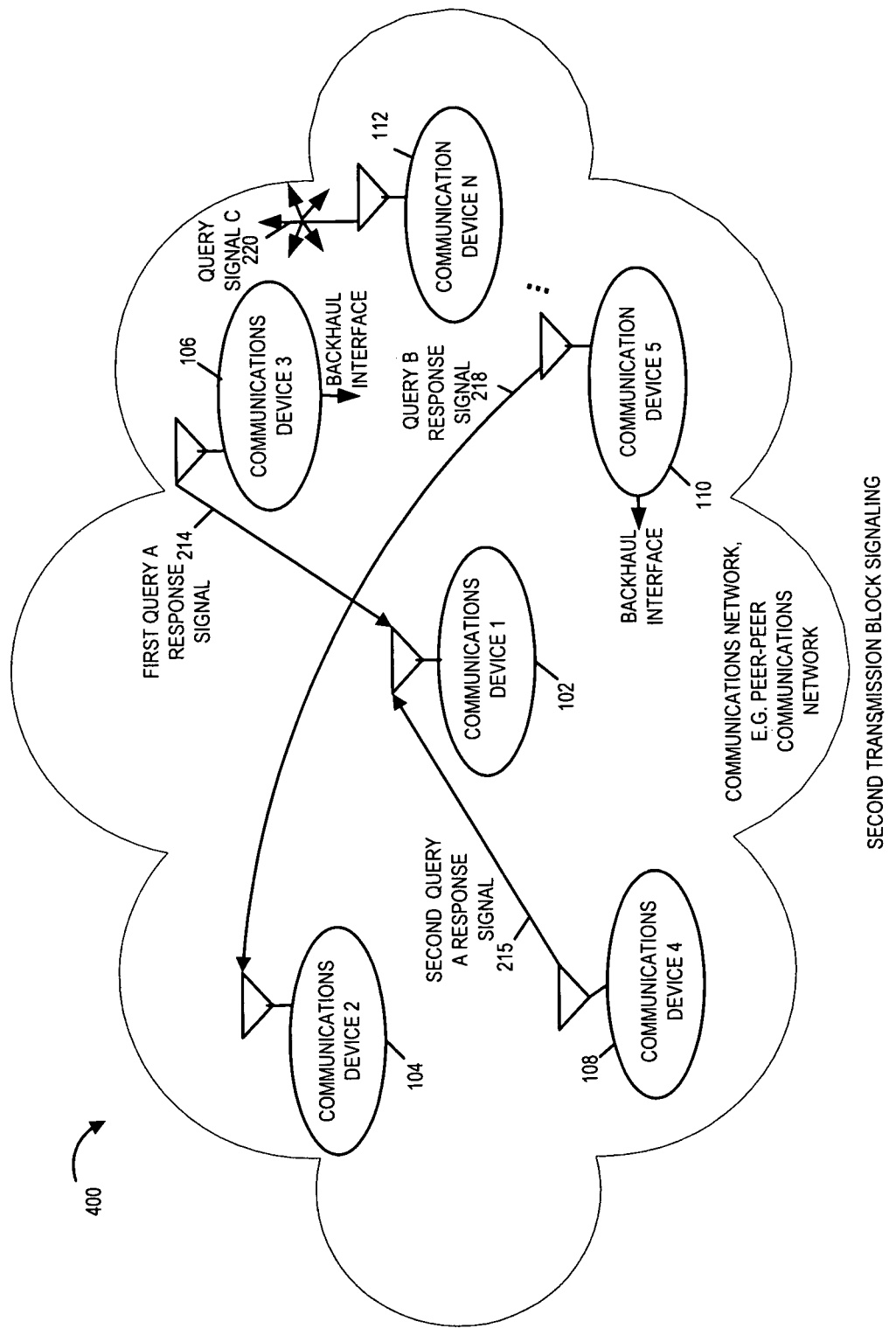
FIG. 4 is a drawing illustrating exemplary signaling carried in the second transmission block.

FIG. 4 is a drawing 400 illustrating exemplary signaling carried in the second transmission block 208. Communications device 3 106 transmits first query A response signal 214 to communications device 1 102 using transmission segment 256 of second transmission block 208, and communications device 4 108 transmits second query A response signal 215 to first communications device 102 using transmission segment 258 of second transmission block 208. Communications device 5 110 transmits query B response signal 218 to communications device 2 104 using transmission segment transmission segment 260 of second transmission block 208. In addition communication device N 112 transmits, e.g., broadcasts, query C signal 220 using transmission segment 262 of second transmission block 208.

Figure 5:
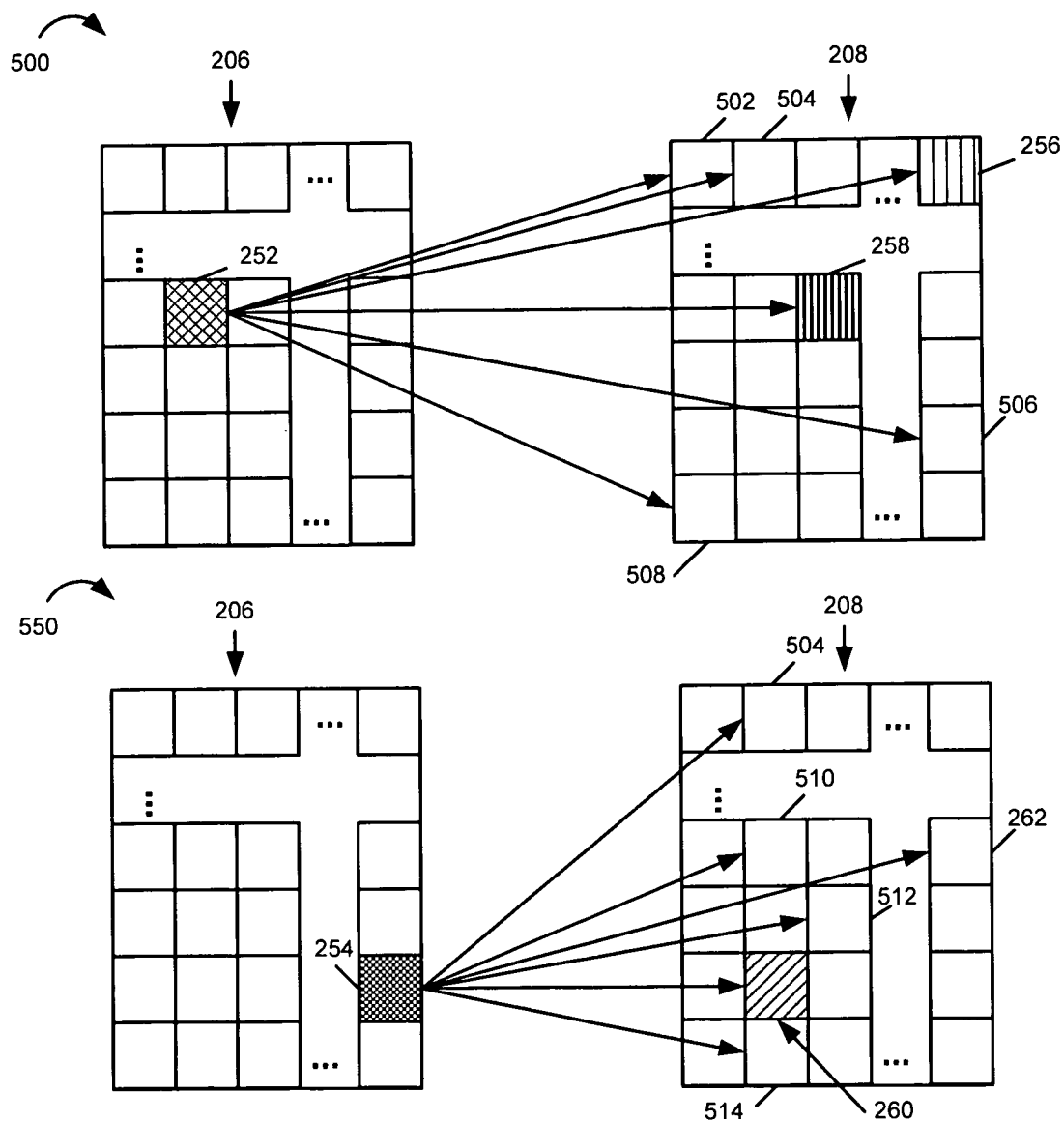
FIG. 5 illustrates an example showing the mapping of a transmission segment used for posting a query in a first transmission block to multiple transmission segments which can be used for responding to the query.

FIG. 5 includes drawing 500 illustrating the mapping of exemplary transmission segment 252 of the first transmission block 206, used for posting a query, to multiple transmission segments (502, 504, 256, 258, 506, 508), in the second transmission block 208, which can be used for responding to the query. FIG. 5 also includes drawing 550 illustrating the mapping of exemplary transmission segment 254 of the first transmission block 206, used for posting a query, to multiple transmission segments (504, 510, 262, 512, 260, 514), in the second transmission block 208, which can be used for responding to the query. In accordance with a feature of this embodiment, a transmission unit used for a query transmission in the first transmission block 206 maps to six different alternative transmission units in the second transmission block which can be used to carry corresponding query responses, e.g., in accordance with a predetermined mapping pattern known to both the device transmitting the query and the device or devices which may transmit a query response.

In some embodiments a query signal includes bits to indicate which specific transmission units in the second transmission block 208 correspond to the transmitted query and can be used to post query response. In other embodiments, predetermined mapping information is stored in the communications devices.

In this exemplary embodiment, it may be observed that transmission segment 504 of second transmission block 208 is a possible request response transmission segment corresponding to both transmission segment 252 and transmission segment 254 of first transmission block 206. In some situations, the overlapping mapping of query response transmission units may create ambiguity as to which query is being responded to by a transmitted query response signal. In some embodiments, a query response signal includes information, e.g., some bits, allocated to identify which query for which the query response is intended and/or the device to which the query response is directed. The overlapping mapping of query response transmission segments in the structure creates the possibility that collisions of query response signals may occur. Various approaches to retransmission of a query and/or retransmission of a query response are used, in some embodiments, to increase the likelihood that a device which transmitted a query will be able to successfully recover a query response. For example, the transmission segment used to carry a query can be independently randomly selected each time a query is to be transmitted, the transmission unit used to carry a query response can be independently randomly selected from its mapped set of possible alternative transmission units each time a query response is to be transmitted, and/or mapping patterns can be changed, e.g., for different pairs of transmission block. In some embodiments, the communications devices which are interested in transmitting queries and/or query responses, may, and sometimes do, transmit the same query and/or same query response multiple times but in different transmission segments.

Figure 6A:
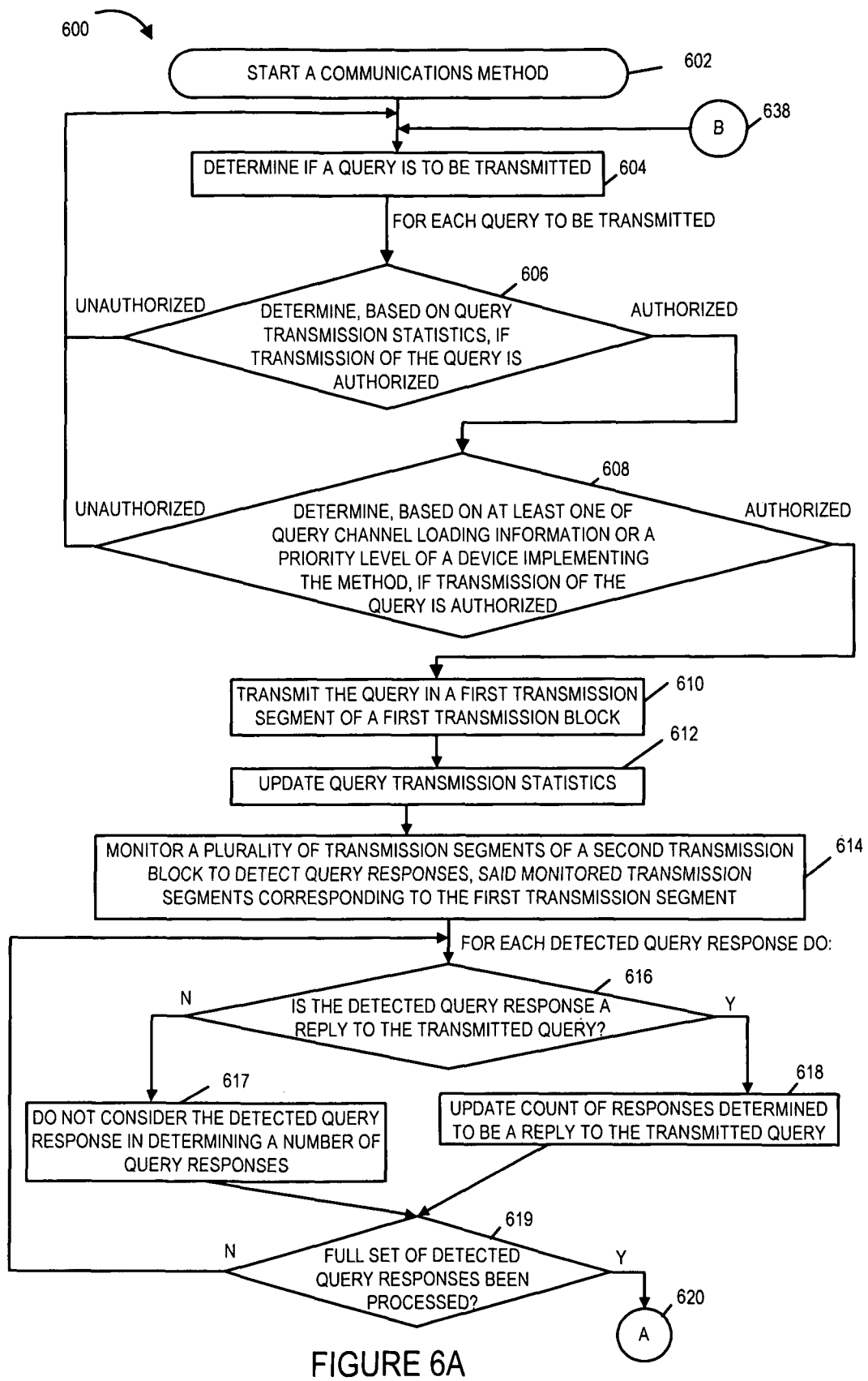
FIG. 6A is a first part of a flowchart showing the steps of an exemplary communications method, in accordance with an exemplary embodiment.
Figure 6B:
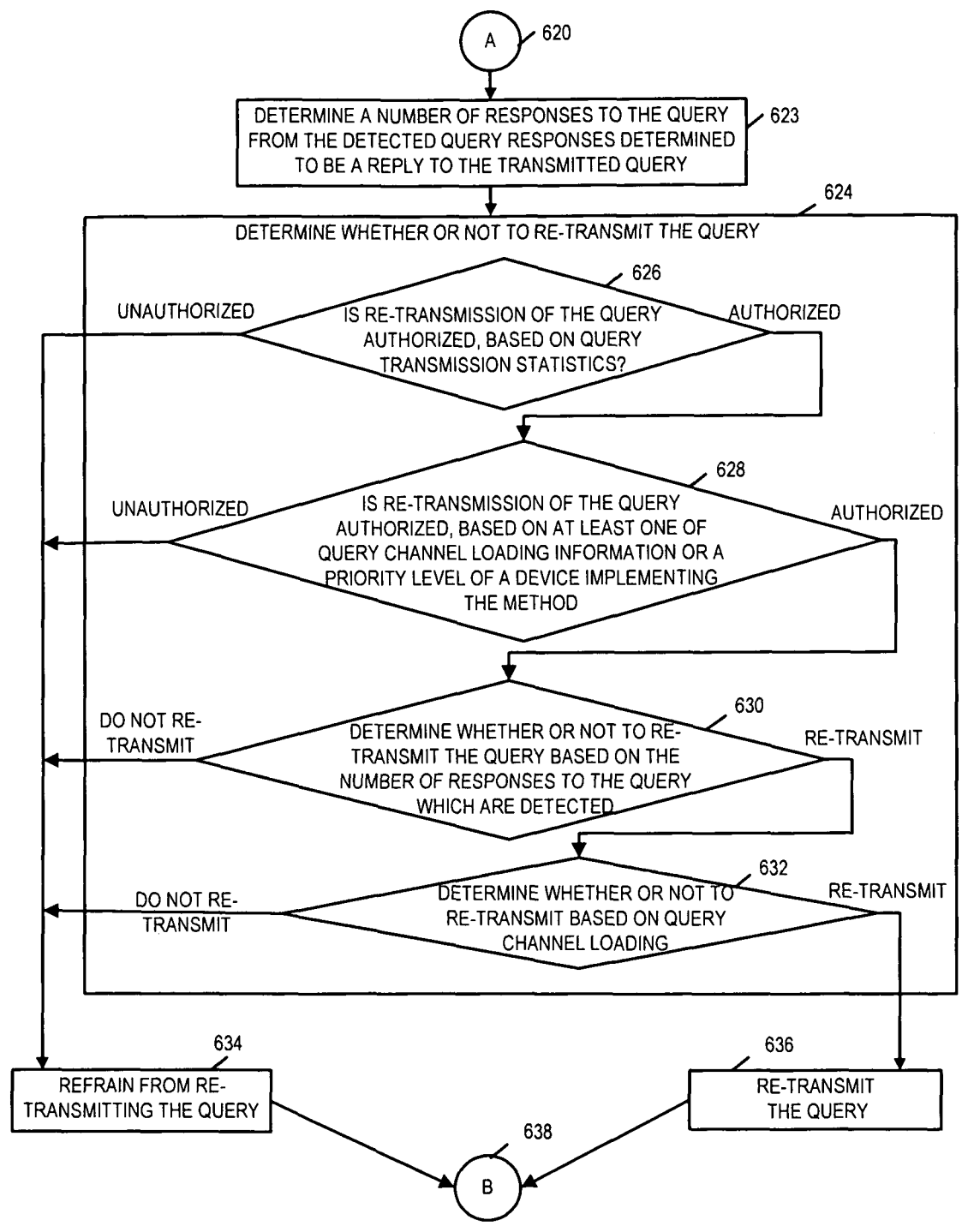
FIG. 6B is a second part of the flowchart illustrating the exemplary method and in combination with FIG. 6A comprises FIG. 6.

FIG. 6, which comprises the combination of FIG. 6A and FIG. 6B, is a flowchart 600 of an exemplary communications method of operating a first communications device in accordance with an exemplary embodiment. The first communications device is, e.g., any of the communications devices (102, 104, 106, 108, 110, 112) of system 100 of FIG. 1.

Operation of the exemplary method starts in step 602 where the first communications device is powered on and initialized. Operation proceeds from start step 602 to step 604.

In step 604 the first communications device determines if a query, e.g., a search query and/or an advertisement, is to be transmitted. In some embodiments, the determination of step 604 is made, at times, by the first communications device without user intervention, e.g., based on a time of day, based on a detected location, and/or based on a detected device, person or condition. In some embodiments, the determination of step 604 is, at times, based on user input, e.g., a user search input and/or user advertisement information. In some embodiments the query is a query for a product, service, activity, e.g., sport, or activity partner.

When it is determined that a query, is to be transmitted, the operation proceeds from step 604 to step 606. In step 606 the first communications device determines, based on query transmission statistics, if transmission of the query is authorized. The query transmission statistics, in some embodiments, is a set of information which is maintained by the first communications device, regarding the usage of the query channel by the first communication device. In some embodiments the query channel includes a plurality of transmission blocks. For example, the query channel may include a plurality of transmission blocks including first and second transmission blocks (206, 208) of FIG. 2. The query transmission statistics are updated each time the first communications device uses the query channel resources to transmit and/or re-transmit a query. In some embodiments the query transmission statistics keep track of the number of times the same query was transmitted by the first communications device in a given time period. In some embodiments the query transmission statistics keep track of the number of query transmissions performed by the first communications device in a given time period.

In some embodiments first communications device determines if the number of query transmissions in a given time period by the first communications device is above a threshold value. The threshold value can be a predetermined value in some embodiments whereas in other embodiments the threshold can be dynamically varied depending on other factors such as query channel loading. In some embodiments, the query channel loading takes into consideration usage of the query channel by other devices. For example, to determine if query transmission is authorized during the transmission period of a first transmission block based on query transmission statistics, the first communications device may consider the number of query transmissions by the first communications device in one or more previous transmission blocks preceding the first transmission block. If the number of query transmissions by the first communications device in the previous transmission block or blocks under consideration is above the threshold value, then query transmission in the first transmission block is determined to be unauthorized and the operation proceeds from step 606 back to step 604. However, if the number of query transmissions by the first communications device is less than the threshold value, then query transmission in the first transmission block is determined to be authorized, and the operation proceeds from step 606 to step 608.

In step 608, the first communications device determines, based on at least one of query channel loading information or a priority level corresponding to the device implementing the method, e.g., the first communications device, if transmission of the query is authorized. In some embodiments, channel loading refers to the usage of the query channel resources by various communications devices, in a period of time. In some embodiments, channel loading refers to usage of the query channel resources by devices other than the first communications device. In some embodiments, channel loading refers to usage of the query channel resources by the first communications device and other communications devices. In some embodiments, first communications device monitors the query channel, and stores information regarding the query channel usage by various other communications devices, e.g., other devices of network 100, during different time periods. For example, the query channel may be heavily used by a number of devices for their transmissions, e.g., query signals and/or query responses during a first time period. However the query channel may be lightly used or may be used by fewer devices, e.g., in a second period of time. Thus channel loading may vary corresponding to different time periods and the first communications device may store channel loading information derived from detected measurements and/or its stored transmission information. In some embodiments, the first communications device estimates an expected channel loading for the first transmission block based on channel loading information corresponding to one or more prior transmission blocks. In some embodiments when channel loading information indicates, e.g., a high level of channel loading, the first communications device determines in step 608 that query transmission is not authorized at that time. However if the query channel loading information indicates, e.g., a lower level of channel loading, then the first communications device determines that query transmission is authorized with regard to the loading criteria.

In some embodiments, in addition to channel loading information, the first communications device also considers the device priority level corresponding to the first communications device, when determining if the query transmission is authorized. In some embodiments, the first communications device considers the device priority level corresponding to the first communications device, when determining if the query transmission is authorized, but does not consider channel loading information when making the authorization determination of step 608. If the first communications device belongs to, e.g., a category of high priority devices, then the first communications device may be authorized to transmit the query while other low priority devices may have to wait for their query transmissions. High priority devices are, e.g., devices paying a premium price for their services, devices which are part of a special group of users such as emergency service providers, and/or devices of a certain special designated type or configuration. In some embodiments, a device's priority level designation may change over time, e.g., a device may be given a high priority level designation during at least some transmission blocks to increase the likelihood of being allowed to transmit a query, or a device may temporarily take on a high level in response to a condition and/or latency consideration. Thus, based on at least one of the query channel loading information or the device priority level, if it is determined that query transmission is not authorized, then operation proceeds from step 608 back to step 604. However if it is determined that query transmission is authorized, operation proceeds from step 608 to step 610.

In step 610, following the determination that query transmission is authorized, the first communications device transmits the query in a first transmission segment of the first transmission block. In some embodiments, the first communications device randomly selects a transmission segment out of a plurality of transmission segments in the first transmission block to transmit its query. In some embodiments, the transmitted query includes an identifier. Thus in step 610 the first communications device transmits its query in the first transmission block using the selected transmission segment. The operation proceeds from step 610 to step 612 wherein the first communications device updates its query transmission statistics. In various embodiments, each time the first communications device transmits a query, the first communications device updates query transmission statistics. Thus the first communications device tracks its query channel usage with regard to its query transmission signaling. The updated query transmission statistics are stored and available to be used by the first communications device when making another authorization determination, e.g., regarding a query transmission authorization determination in another, e.g., subsequent, transmission block.

Operation proceeds from step 612 to step 614. In step 614 the first communications device monitors a plurality of transmission segments of a second transmission block to detect query responses, said monitored transmission segments corresponding to said first transmission segment. FIG. 5 described exemplary mapping between a transmission segment in a first transmission block used to carry a query signal and a corresponding set of transmission segments in a second transmission block which may be used to carry query responses. The first communications device in at least some embodiments is aware of the transmission segments of the second transmission block that correspond to the first transmission segment of the first transmission block. Accordingly, the first communications device monitors the identified corresponding transmission segments of the second transmission block for the query responses.

In some embodiments, the corresponding transmission segments of the second transmission block which map to the transmission segment of the first transmission block which carried the query are randomly arranged within the second transmission block. In some embodiments a transmission query signal includes bits to indicate which specific transmission segments in the second transmission block correspond to the query and can be used by one or more replying devices to post query responses. In some embodiments, there is a predetermined mapping between a transmission segment in the first transmission block used to carry a query and a set of transmission segments in a subsequent transmission block that may be used to carry corresponding query responses, and the predetermined mapping is known to the device transmitting the query and the device or devices transmitting the query response or responses.

A communications device sending a query response in response to the transmitted query of step 610 may, and in some embodiments does, randomly select one or more transmission segments out of the set of corresponding transmission segments of the second transmission block, to send its query response. It should be noted that in some embodiments different devices that wish to transmit a query response or send a query may also unintentionally select to transmit on the same transmission segment of the second transmission block. Such an unintentional reuse of the same transmission segment of the second transmission block may decrease the likelihood that a transmitted query response is successfully recovered by the first communications device.

It should be appreciated that while monitoring the plurality of transmission segments in the second transmission block for query responses, the first communications device may detect one or more query responses. In some embodiments, for each detected query response in step 614, operation proceeds to step 616.

In step 616 the first communications device determines whether or not the detected query response is a response to its transmitted query of step 610. In some embodiments, determining whether or not a query response is in response to the transmitted query includes recovering an identifier from the detected query response being evaluated and comparing it to the identifier used in the transmitted query of step 310. Operation proceeds from step 616 to 618 when it is determined that the detected query response is a reply to the transmitted query of step 610. Operation proceeds from step 616 to step 618 when a detected query is not determined to be a response to the transmitted query of step 610.

In some embodiments, a query response includes one or more bits to associate it with a particular query. For example, the query response may include the same identifier that was transmitted in the query to which the query response corresponds. In some embodiments, the information provided in the query response is sufficient to determine whether the detected query response is a response to the query of step 610. In some embodiments the first communications device maintains a count of the query responses which are determined to be a reply to its transmitted query of step 610. This count or the number of query response which are determined to be a reply to its transmitted query, may and sometimes is, used by the first communications device in making one or more decisions. Consider as an example, that the transmitted query of step 610 is a search query for brand X shoes, and one or more devices corresponding to shoe stores, factory outlets, malls etc., receive the query and decide to send query responses as a reply to the query of step 610. Thus, the first communications device monitoring to detect query responses may, in such a situation, detect a plurality of query responses in response to its query of step 610. However, due to the structure of allowing potentially overlapping sets of transmission response segments in the second transmission block corresponding to different queries, some of the detected query responses from step 614 may be replies to queries other than the query of step 610. Some of the detected query responses may be, e.g., responses to different queries transmitted by devices other than the first communications device in the first transmission block.

If in step 616 the first communications device determines that the detected query response being processed is a reply to its transmitted query of step 610, then operation proceeds from step 616 to step 618 where the first communications device updates the count of the query responses determined to be a reply to the its transmitted query of step 610. Operation proceeds from step 618 to step 619.

However, in step 616 the first communications device determines that the detected response being processed is not a reply to its transmitted query of step 610 then the operation proceeds from step 616 to step 617, where the detected query response is not considered in determining a number of query responses which are in reply to the transmitted query of step 610, and the count of replies remains unchanged from its previous number. Operation proceeds from step 617 to step 619

In step 619, the first communications device considers whether or not the full set of detected query responses from the monitoring of step 614 has been processed. If the full set of detected responses has not been processed, then operation proceeds from step 619 to step 616. However, if the full set of detected responses has been processed, then operation proceeds from step 619 via connection node A 620 to step 623.

In step 623, the number of responses to the transmitted query is determined from the detected query responses determined to be a reply to the transmitted query of step 610. The determined number of responses is, for example, the current updated count of responses which was last updated in the last iteration of step 618. The operation proceeds from step 623 to step 624 wherein the first communications device determines whether or not to re-transmit the query of step 610. In some embodiments, step 624 includes one or more of steps 626, 628, 630 and 632. Operation will be described for an embodiment including each of steps 626, 628, 630 and 632. However, it should be appreciated that one or more of steps 626, 628, 630 and 632 may be omitted and bypassed in some embodiments.

In step 626, the first communications device determines if it is authorized to re-transmit the query of step 610 based on query transmission statistics. Thus, based on the past usage of the query channel by the first communications device during a period of time, the first communications device may or may not be authorized to use the query channel for re-transmitting the query. If the re-transmission is authorized based on first communications device query transmission statistics then operation proceeds from step 626 to step 628. However, if the re-transmission is not authorized based on first communications device query transmission statistics then operation proceeds from step 626 to step 634.

In some embodiments, as part of step 626, the first communications device determines if the number of query transmissions and/or re-transmissions by the first communications device in a given time period is above a threshold value. This determination provides, e.g., an indication of the past usage the query channel by the first communications device during that time period. In some such embodiments, if the number of transmission and/or re-transmissions is determined to be above the threshold value, then the first communications device is not authorized to re-transmit. However the number of transmissions and/or re-transmissions is determined to be below the threshold value then the first communications device may be authorized to re-transmit with regard to this authorization criteria. Thus, if it is determined in step 626 that query re-transmission is authorized based on query transmission statistics, the operation proceeds to step 628. If query re-transmission is unauthorized, the operation proceeds to step 634.

In step 628 the first communications device determines if query re-transmission is authorized based on at least one of query channel loading information or the priority level of the first communications device. As discussed in step 608, the first communications device may monitor various transmission blocks in a query channel to determine the query channel usage by various other communications devices during different time periods. This determination of query channel usage by various devices during a period of time, provides an estimate of the query channel loading during that period of time. In some embodiments if there is a high level of channel loading indicated by query channel loading information, the first communications device determines in step 628 that the first communications device is not authorized to re-transmit the query. However, if the determined query channel loading is low, then query re-transmission may be authorized. In accordance with one aspect of some embodiments, some devices having a high priority level belong to a category of, e.g., high priority devices, and may be provided special privileges which normally other regular devices may not avail. For example, some devices belonging to the category of high priority devices may have authorization to more frequently use the query channel as compared to other devices, as a special privilege. Thus in some embodiments high priority devices can re-transmit queries more frequently than lower priority device. In some embodiments, as part of determining whether or not it is authorized to re-transmit the query, the first communications device determines if it has a priority level that authorizes the first communications to re-transmit the query. In some embodiments a device's priority level may, and sometimes does change over time, e.g., as a function of predetermined information and/or a detected condition, location, device, person, and/or time latency consideration.

Based on the first communications device's current device priority level, the first communications device may or may not be authorized to re-transmit the query. In some embodiments, a device with a high priority level is allowed to re-transmit the query even if there is an indication of a high level of query channel loading. However this may not be the case in some other embodiments. For example, in some embodiments, high loading considerations may override priority level determinations in preventing authorization. Based on the determination made in step 628 if re-transmission of the query is authorized, operation proceeds from step 628 to step 630. If it is determined that re-transmission of the query is not authorized, operation proceeds from step 628 to 634.

In step 630, the first communications device determines whether or not to re-transmit the query based on the number of responses to the query which were detected. In some embodiments, the number of responses is the count of the number or query responses which are determined to be a reply to the query of step 610. In some embodiments, the first communications device compares the determined number of responses with, e.g., a threshold value, which could be pre-determined threshold or a dynamic threshold, to determine whether or not to re-transmit the query of step 610. For example, the first communications device may be configured in some embodiments to re-transmit the query of step 610 if the number of responses to query of step 610 is below a predetermined threshold, e.g. 3. In some embodiments, the user of the first communications device and/or the first communications device may modify this threshold value, e.g., decrease or increase, based on, e.g., type of query, past experience of the number of responses received when the same or similar search was previously performed by the user of the device, etc. If it is determined that the query of step 610 should be re-transmitted based on the number of responses, then the operation proceeds from step 630 to step 632. However if it is determined that, for example, a sufficient number of responses have been detected and query re-transmission is not desired, operation proceeds from step 630 to step 634.

In step 632, the first communications device determines whether or not to re-transmit the query based on query channel loading. In some embodiments, determination to re-transmit the query is more probable when there is a first level of query channel loading than when there is a second level of query channel loading, the second level of query channel loading indicating a higher level of query channel loading than said first level. Thus, in some embodiments the first communications device determines to re-transmit the query when the query channel loading is low, for example, below 50%.

When it is determined to re-transmit the query, based on the level query channel loading, operation proceeds from step 632 to step 636 where the first communications device re-transmits the query of step 610. Operation proceeds from step 636 back to step 604 via connecting node B 638. If however, in step 632 the first communications device determines not to re-transmit the query based on the level query channel loading, operation proceeds from step 632 to step 634.

In step 634, the first communications device refrains from re-transmitting the query and the operation proceeds from step 634 back to step 604 via connecting node B 638.

Figure 7:
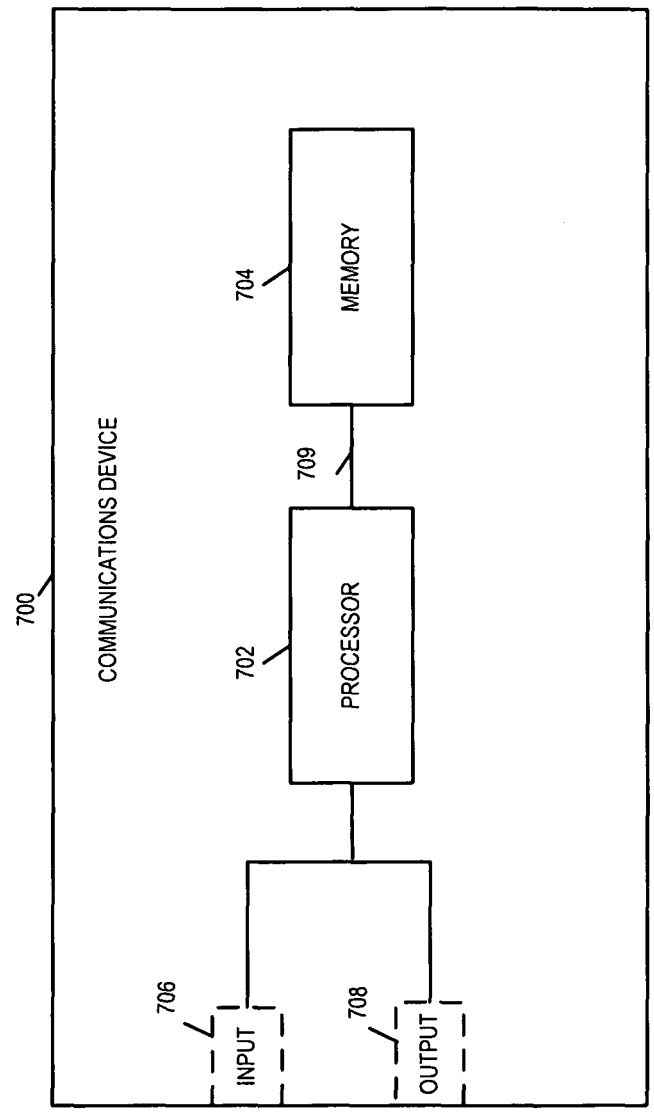
FIG. 7 shows an exemplary communications device which can be used in the system of FIG. 1 to implement the method of the flowchart of FIG. 6.

FIG. 7 is a drawing of an exemplary communications device 700 in accordance with one exemplary embodiment. Communications device 700 is, e.g., one of the exemplary communications devices of FIG. 1. Communications device 700 is, e.g., a mobile wireless terminal supporting peer to peer communications and implementing a method in accordance with flowchart 600 of FIG. 6. Communications device 700 includes a processor 702 and memory 704 coupled together via a bus 709 over which the various elements (702, 704) may interchange data and information. Communications device 700 further includes an input module 706 and an output module 708 which may be coupled to the processor 702 as shown. However, in some embodiments the input module and output module (706, 708) are located internal to the processor 702. Input module 706 can receive input signals. Input module 706 can, and in some embodiments does, include a wireless receiver and/or a wired or optical input interface for receiving input. Output module 708 may include, and in some embodiments does include, a wireless transmitter and/or a wired or optical output interface for transmitting output.

Processor 702, in some embodiments, is configured to: transmit a query in a first transmission segment of a first transmission block, and monitor a plurality of transmission segments of a second transmission block to detect query responses, said monitored transmission segments corresponding to said first transmission segment. In some embodiments the first and second transmission blocks are part of a query channel. In some embodiments the query is a query for a product, service, activity, e.g., gaming, or activity partner.

In some embodiments the processor 702 is configured to determine based on query transmission statistics, prior to transmitting the query, if transmission of the query is authorized. In some embodiments the processor 702 is further configured to determine, prior to transmitting the query, if transmission of the query is authorized based on at least one of query channel loading information or a priority level corresponding to the communications device 700. In at least some embodiments, the processor 702 is configured to determine whether to re-transmit the query based on a number of responses to said query which are detected.

The processor 702 may and in some embodiments is, further configured to determine whether to re-transmit the query based on query channel loading, said determining to re-transmit being more probable when there is a first level of query channel loading than when there is a second level of query channel loading, the second level of query channel loading indicating a higher level of query channel loading than said first level. In some embodiments the processor 702 is further configured to determine, for each detected query response, if the detected query response is a reply to the transmitted query, and determine said number of responses to said query from the detected query responses determined to be a reply to the transmitted query. In some embodiments the processor 702 is further configured to determine based on query transmission statistics, prior to re-transmitting the query, if re-transmission of the query is authorized. The processor 702 may and in some embodiments is, further configured to determine prior to re-transmitting the query, if re-transmission of the query is authorized based on at least one of query channel loading information and a priority level corresponding to device 700.

Figure 8:
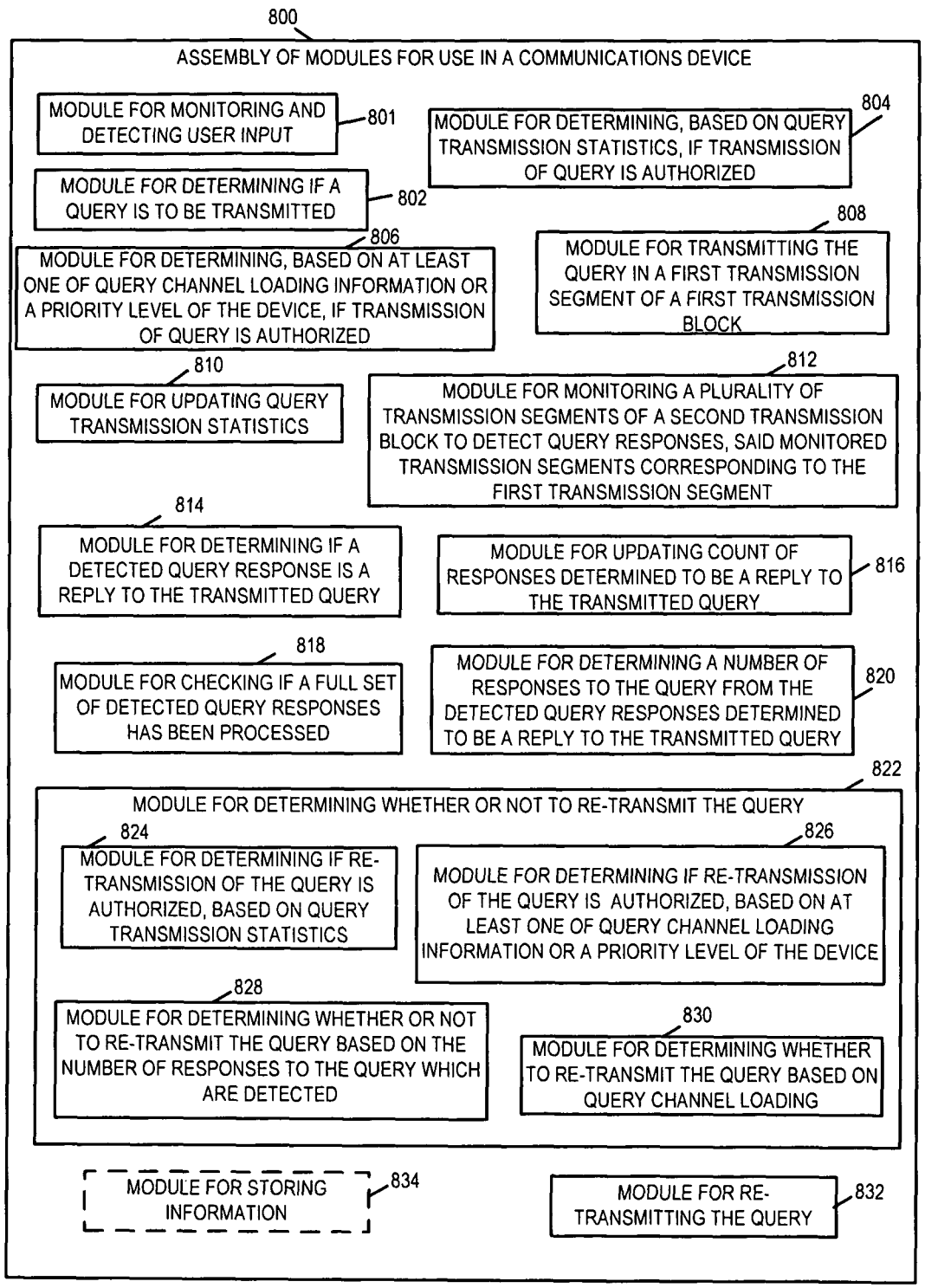
FIG. 8 illustrates an assembly of modules which can be used in the exemplary communications device of FIG. 7.

FIG. 8 illustrates an assembly of modules 800 which can be used in the exemplary communications device 700 illustrated in FIG. 7. The modules in the assembly 800 can be implemented in hardware within the processor 702 of FIG. 7, e.g., as individual circuits. Alternatively, the modules may be implemented in software and stored in the memory 704 of the communications device 700 shown in FIG. 7. While shown in the FIG. 7 embodiment as a single processor, e.g., computer, it should be appreciated that the processor 702 may be implemented as one or more processors, e.g., computers.

When implemented in software the modules include code, which when executed by the processor 702, configure the processor to implement the function corresponding to the module. In embodiments where the assembly of modules 800 is stored in the memory 704, the memory 704 is a computer program product comprising a computer readable medium comprising code, e.g., individual code for each module, for causing at least one computer, e.g., processor 702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 8 control and/or configure the communications device 700 or elements therein such as the processor 702, to perform the functions of the corresponding steps illustrated in the method flowchart 600 of FIG. 6.

As illustrated in FIG. 8, the assembly of modules 800 includes a module 801 for monitoring and detecting a user input, a module 802 for determining if a query is to be transmitted, a module 804 for determining based on query transmission statistics if transmission of query is authorized, a module 806 for determining, based on at least one of query channel loading information or a priority level of the device, e.g., device 700, if transmission of a query is authorized, a module 808 for transmitting the query in a first transmission segment of a first transmission block, a module 810 for updating query transmission statistics, and a module 812 for monitoring a plurality of transmission segments of a second transmission block to detect query responses, said monitored transmission segments corresponding to the first transmission segment.

In some embodiments, the assembly of modules 800 further includes a module 814 for determining if a detected query response is a reply to the transmitted query, a module 816 for updating a count of query responses determined to be a reply to the transmitted query, a module 818 for checking if a full set of detected query responses has been processed, a module 820 for determining a number of responses to the query from the detected query responses determined to be a reply to the transmitted query, a module 822 for determining whether or not to re-transmit the query and a module 832 for re-transmitting the query.

In some embodiments, the module 822 includes one or more of: a module 824 for determining if re-transmission of the query is authorized based on query transmission statistics, a module 826 for determining if re-transmission of the query is authorized based on at least one of query channel loading information or a priority level of the device 700, a module 828 for determining whether or not to re-transmit the query based on the number of responses to the query which are detected, and a module 830 for determining whether to re-transmit the query based on query channel loading. In some embodiments the determination by module 830 to re-transmit is more probable when there is a first level of query channel loading than when there is a second level of query channel loading, the second level of query channel loading indicating a higher level of query channel loading than said first level. In some embodiments, among the assembly modules 800 there is a storage module 834 for storing information, e.g., channel loading information and/or query transmission count information.

Various embodiments are well suited for use in a peer to peer network. At least some methods and apparatus relate to searching for geographically close by devices and/or services using a peer to peer network. In some embodiments, a dedicated channel, is implemented and used. In some embodiments, the channel used for the communication of query and query response information is referred to as a query channel, e.g., a query channel which is a dedicated channel. In some embodiments, the query channel has N orthogonal resources every T seconds, where N is a positive integer and T is a positive value. In some embodiments, an orthogonal resource is a transmission segment. In some embodiments, each of the N orthogonal resources can carry B information bits. For example, in one such embodiment N=200, T=1 sec, and B=50. In some embodiments, the N orthogonal resources are included in a query channel transmission block.

The usage of the query channel includes posting queries and receiving replies to those queries. In some embodiments, the posting of queries is performed in a random access fashion. In one embodiment, a device which desires to transmit a query and has determined that it is authorized, randomly picks one of the N resources, e.g., one transmission segment in a first transmission block. The device generates a query signal and transmits the generated query signal on the selected resource. The information bits of the query signal carry the information that the device is looking for. The information, e.g., could come from a search entered by the user on the device. For example, the query information bits could indicate the user of the device is searching for a product, a service, an activity, activity partner, a person, a group, or an event. Specific examples of searches include: a search for shoes, a search for a restaurant, a search for one or more club members, a search for a free Internet hot spot, a search for a computer gaming partner, a search for a sport, a search for a theater with available tickets, a search for gas station, etc.

Other devices are monitoring the query channel for transmitted queries. Multiple devices can, and sometimes do, transmit query responses to the same query. A device detecting a query processes the query and makes a decision whether or not to reply. A device wishing to reply to the query generates a query response signal which it transmits on one of the orthogonal resource, e.g., a transmission segment of a second transmission block. In some embodiments, a device sending a query response randomly selects the resource on which to send its generated response signal from among a set of resources. In some embodiments, the resource used for the query response can depend on the query being posted. For example, in one embodiment, each query response could come on one of K specific resources out of the set of N resources in a second transmission block. In one exemplary embodiment, N=200 resources, e.g., segments in a transmission block and K=10. The devices which typically are replying to the queries are service provider devices such as a restaurant or shoe store. Note that in this exemplary embodiment, both query and query responses can, and sometimes do, collide since the query channel is a random access channel.

In some embodiments, the technique for posting queries and replies is random access, and it can be beneficial to provide a mechanism for blind reposting of queries and replies. In some embodiments reposting of queries and/or replies involves the transmission of the same information multiple times with the information being communicated on different resources at least some times. In some embodiments, the number of retransmissions depends on the perceived usage of the query channel.

The query channel, in some embodiments, is random access with limited resources. In some such embodiments, each device which may use the query channel will have limitations on how often it can use the query channel. In some such embodiments, whether a particular device can use the query channel depends on one or more of: past usage of the query channel by that particular device, the type of device, a priority level currently associated with the device, and the perceived average usage of the query channel by surrounding devices.

In one example, a device is classified by a QoS level associated with the device. In some such embodiments, a high QoS level is obtained by paying more to the service provider for the high QoS level than the low QoS level. In some such embodiments, a device's amount of access to the query channel is associated with the devices QoS level, with devices having higher QoS priority levels being given more access than devices with lower QoS priority levels.

In some embodiments, the amount of access to the query channel is based on the amount of usage of the query channel. For example, in one embodiment, where a device perceives that there is 10% loading of the query channel there may be no or very limited restrictions placed on it with regard on query transmissions, e.g., the device may be allowed to transmit one query in every query channel transmission block. Continuing with the example, if the device perceives that query channel loading is 50% or greater the device may be restricted to be allowed to transmit a query once in every 10 seconds.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations, communications devices and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, a decision step, a determination step or steps, message generation, message signaling, switching, reception and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Some embodiments are directed to a computer program product comprising a computer-readable medium, e.g., a physical medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

The P2P spectrum may use Orthogonal Frequency Division Multiplexing (OFDM) signals. However, it should be appreciated that at least some of the methods and apparatus of various embodiments are applicable to a wide range of communications systems including many non-OFDM and/or non-cellular systems such as CDMA systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In various embodiments the peer to peer communications devices are implemented as notebook computers, personal data assistants (PDAs), or other portable devices including receiver/transmitter circuits and logic and/or routines, for implementing the methods.

What is claimed is:

1. A communications method comprising:
    selecting a first transmission segment of a first transmission block out of a plurality of transmission segments in the first transmission block, the selecting configured to decrease a likelihood of a second device transmitting a query request in the selected first transmission segment, the first transmission segment of the first transmission block mapped to a plurality of transmission segments of a second transmission block, each transmission segment of the plurality of transmission segments of the second transmission block usable for responding to query requests transmitted in the first transmission segment;
    transmitting, on a query channel, a query request in the selected first transmission segment;
    monitoring the plurality of transmission segments of the second transmission block to detect query responses, each transmission segment of the plurality of transmission segments comprising one or more tone-symbols, each tone-symbol an air link resource of one tone for one transmission time interval;
    for each of the detected query responses, determining if the detected query response is a response to the transmitted query request; and
    responsive to determining at least one query response of the detected query responses is a response to the transmitted query request, updating query channel information based upon the at least one query response.

2. The communications method of claim 1, further comprising:
    determining whether to re-transmit the query request based on a number of the detected query responses that are responses to the transmitted query request.

3. The communications method of claim 2, wherein said determining whether to re-transmit the query request is also based on query channel loading, said determining to re-transmit being more probable when there is a first level of query channel loading than when there is a second level of query channel loading, the second level of query channel loading indicating a higher level of query channel loading than said first level.

4. The communications method of claim 2, further comprising:
determining said number of the detected query responses that are responses to the transmitted query request.

5. The communications method of claim 1, further comprising:
prior to transmitting the query request, determining, based on query transmission statistics, if transmission of the query request is authorized.

6. The communications method of claim 1, further comprising:
prior to transmitting the query request, determining if transmission of the query request is authorized based on at least one of query channel loading information or a priority level corresponding to a device implementing the method.

7. The communications method of claim 1, wherein said query request is a query for a product, service, activity or activity partner.

8. The communications method of claim 1, wherein a second query request is carried in at least one other transmission segment of the second transmission block.

9. The communications method of claim 1, wherein the determining if the detected query response is a response to the transmitted query request comprises determining if the detected query response includes information identifying the detected query response as a response to the transmitted query request.

10. A communications device comprising:
means for selecting a query in a first query request transmission segment of a first transmission block out of a plurality of query request transmission segments in the first transmission block, the first query request transmission segment of the first transmission block mapped to a plurality of query response transmission segments of a second transmission block, each query response transmission segment of the plurality of query response transmission segments of the second transmission block usable for responding to query requests transmitted in the first query request transmission segment;
means for transmitting a query request in the selected first query request transmission segment on a query channel in a peer-to-peer system;
means for monitoring the plurality of transmission segments of the second transmission block to detect query responses from at least one peer in the peer-to-peer system, each transmission segment of the plurality of transmission segments comprising one or more tone-symbols, each tone-symbol an air link resource of one tone for one transmission time interval;
means for determining, for each of the detected query responses, if the detected query response is a response to the transmitted query request; and
means for, responsive to determining at least one query response of the detected query responses is a response to the transmitted query request, updating query channel information based upon the at least one query response.

11. The communications device of claim 10, further comprising:
means for determining whether to re-transmit the query request based on a number of the detected query responses that are responses to the transmitted query request.

12. The communications device of claim 11, further comprising:
means for determining whether to re-transmit the query request based on query channel loading of the query channel, said determining to re-transmit being more probable when there is a first level of query channel loading on the query channel than when there is a second level of query channel loading on the query channel, the second level of query channel loading indicating a higher level of query channel loading than said first level.

13. The communications device of claim 11, further comprising:
means for determining said number of the detected query responses that are responses to the transmitted query request.

14. The communications device of claim 10, further comprising:
means for determining, prior to transmitting the query request, if transmission of the query request is authorized based on query transmission statistics.

15. The communications device of claim 10, further comprising:
means for determining, prior to transmitting the query request, if transmission of the query request is authorized based on at least one of query channel loading information associated with the query channel or a priority level corresponding to said device.

16. The communications device of claim 10, wherein a second query request is carried in at least one other transmission segment of the second transmission block.

17. The communications device of claim 10, wherein the means for determining if the detected query response is a response to the transmitted query request is configured to determine if the detected query response includes information identifying the detected query response as a response to the transmitted query request.

18. A computer program product for use in a communications device, comprising:
a non-transitory computer readable medium comprising:
code for causing at least one computer to select a first query request transmission segment of a first transmission block out of a plurality of query request transmission segments in the first transmission block, and select the first query transmission segment to decrease a likelihood of a second device transmitting a query request in the selected first query request transmission segment, the first query request transmission segment of the first transmission block mapped to a plurality of transmission segments of a second transmission block, each transmission segment of the plurality of transmission segments of the second transmission block usable for responding to query requests transmitted in the first query request transmission segment;
code for causing the at least one computer to transmit a query request in the first query request transmission segment in a peer-to-peer system;
code for causing the at least one computer to monitor the plurality of transmission segments of the second transmission block to detect query responses, each transmission segment of the plurality of transmission segments comprising one or more tone-symbols, each tone-symbol an air link resource of one tone for one transmission time interval;

code for causing the at least one computer to determine, for each of the detected query responses, if the detected query response is a response to the transmitted query request; and code for causing the at least one computer to, responsive to determining at least one query response of the detected query responses is a response to the transmitted query request, update query channel information based upon the at least one query response.

19. The computer program product of claim 18, wherein the non-transitory computer readable medium further comprises:

code for causing the at least one computer to determine whether to re-transmit the query request based on the updated query channel information, the updated query channel information comprising a number of the detected query responses that are responses to the transmitted query request.

20. The computer program product of claim 18, wherein a second query request is carried in at least one other transmission segment of the second transmission block.

21. The computer program product of claim 18, wherein the code for causing the at least one computer to determine if the detected query response is a response to the transmitted query request causes the at least one computer to determine if the detected query response includes information identifying the detected query response as a response to the transmitted query request.

22. A communications device comprising:

at least one processor; and a memory coupled to said at least one processor, the at least one processor configured to:

select a first transmission segment of a first transmission block out of a plurality of transmission segments in the first transmission block usable for transmitting query requests, the selecting configured to decrease a likelihood of a second device transmitting a query request in the selected first transmission segment, the first transmission segment of the first transmission block mapped to a sub-set of transmission segments out of a plurality of transmission segments of a second transmission block, each transmission segment of the sub-set of transmission segments of the second transmission block usable for responding to query requests transmitted in the first transmission segment;

transmit a query request in the first transmission segment;

monitor the sub-set of transmission segments of the second transmission block to detect query responses, each transmission segment of the plurality of transmission segments comprising one or more tone-symbols, each tone-symbol an air link resource of one tone for one transmission time interval;

for each of the detected query responses, determine if the detected query response is a response to the transmitted query request; and responsive to determining at least one query response of the detected query responses is a response to the transmitted query request, update query channel information based upon the at least one query response.

23. The communications device of claim 22, wherein said at least one processor is further configured to:

determine whether to re-transmit the query request based on a number of the detected query responses that are responses to the transmitted query request.

24. The communications device of claim 23, wherein said at least one processor is further configured to determine whether to re-transmit the query request based on query channel loading of a query channel on which the query request was transmitted, said determining to re-transmit being more probable when there is a first level of query channel loading on the query channel than when there is a second level of query channel loading on the query channel, the second level of query channel loading indicating a higher level of query channel loading than said first level.

25. The communications device of claim 23, wherein said at least one processor is further configured to:

determine said number of the detected query responses that are responses to the transmitted query request.

26. The communications device of claim 22, wherein said at least one processor is further configured to determine, based on query transmission statistics, and prior to transmitting the query request, if transmission of the query request is authorized.

27. The communications device of claim 22, wherein a second query request is carried in at least one other transmission segment of the second transmission block.

28. The communications device of claim 22, wherein the at least one processor is further configured to determine if the detected query response is a response to the transmitted query request by determining if the detected query response includes information identifying the detected query response as a response to the transmitted query request.

* * * * *